US008605267B2

(12) United States Patent
Lohner

(10) Patent No.: US 8,605,267 B2
(45) Date of Patent: Dec. 10, 2013

(54) SENSOR FOR CHECKING VALUABLE DOCUMENTS

(75) Inventor: Joseph Lohner, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 493 days.

(21) Appl. No.: 12/808,886

(22) PCT Filed: Dec. 15, 2008

(86) PCT No.: PCT/EP2008/010654

§ 371 (c)(1), (2), (4) Date: Jun. 17, 2010

(87) PCT Pub. No.: WO2009/083126

PCT Pub. Date: Jul. 9, 2009

(65) Prior Publication Data

US 2010/0271619 A1 Oct. 28, 2010

(30) Foreign Application Priority Data

Dec. 21, 2007 (DE) ........................ 10 2007 062 122

(51) Int. Cl.

| | |
|---|---|
| ***G06K 9/00*** | (2006.01) |
| ***B65G 13/00*** | (2006.01) |
| ***B65G 17/00*** | (2006.01) |

(52) U.S. Cl.

USPC ................................ 356/71; 356/72; 198/617

(58) Field of Classification Search

USPC ............... 356/71–72, 429–431, 238.1–238.3; 235/462.38; 271/272, 10.03, 4.03, 271/258.01; 250/559.45, 559.46; 198/617

See application file for complete search history.

(56) References Cited

U.S. PATENT DOCUMENTS

| | | | | |
|---|---|---|---|---|
| 3,976,342 | A | 8/1976 | Leyendecker et al. | |
| 4,884,679 | A | 12/1989 | Graef et al. | |
| 4,938,071 | A * | 7/1990 | Kobayashi et al. | 73/849 |
| 5,013,911 | A * | 5/1991 | Koshida et al. | 250/239 |
| 5,265,855 | A * | 11/1993 | Kimura et al. | 270/58.15 |
| 5,342,165 | A * | 8/1994 | Graef et al. | 414/788.9 |
| 5,955,741 | A * | 9/1999 | Kayani | 250/559.11 |
| 5,974,883 | A * | 11/1999 | Ross | 73/587 |

(Continued)

FOREIGN PATENT DOCUMENTS

| | | |
|---|---|---|
| DE | 2234428 | 1/1974 |
| DE | 10242398 A1 | 3/2004 |

(Continued)

OTHER PUBLICATIONS

International Search Report in PCT/EP2008/010654, dated May 29, 2009.

(Continued)

*Primary Examiner* — Sang Nguyen

(74) *Attorney, Agent, or Firm* — Bacon & Thomas, PLLC

(57) ABSTRACT

A value-document processing apparatus for documents of value, such as, e.g. bank notes, checks, etc. having a transport system and one or more sensors. The sensors have a sensor surface past which the bank notes are transported, where the sensor surface is provided with a plurality of elevations or depressions. Through the structured surface, the friction is decreased between the sensor surface and the transported document of value, so that the transport of the document of value is stabilized and the proneness to jamming is reduced.

25 Claims, 4 Drawing Sheets

(56) References Cited

U.S. PATENT DOCUMENTS

| | | | | |
|---|---|---|---|---|
| 6,164,638 | A | 12/2000 | Owens et al. | |
| 6,290,351 | B1 * | 9/2001 | Merz | 347/104 |
| 6,797,976 | B2 * | 9/2004 | Pechan et al. | 250/559.45 |
| 6,881,962 | B2 | 4/2005 | Kamijo et al. | |
| 7,255,338 | B2 * | 8/2007 | Wilfer et al. | 271/10.03 |
| 7,793,832 | B2 * | 9/2010 | Utz et al. | 235/379 |
| 2004/0035932 | A1 * | 2/2004 | Bailleu et al. | 235/454 |
| 2004/0125358 | A1 * | 7/2004 | Numata | 356/71 |
| 2004/0236691 | A1 | 11/2004 | Force et al. | |
| 2007/0063431 | A1 * | 3/2007 | Haberstroh | 271/272 |
| 2009/0008455 | A1 * | 1/2009 | Mayer et al. | 235/462.38 |
| 2010/0005888 | A1 * | 1/2010 | Domke et al. | 73/596 |

FOREIGN PATENT DOCUMENTS

| | | | |
|---|---|---|---|
| EP | 1482456 | A2 | 12/2004 |
| EP | 1818876 | A1 | 8/2007 |
| GB | 1253715 | | 11/1971 |

OTHER PUBLICATIONS

Search report of German Patent Office regarding German Patent Application No. 10 2007 062 122.3, Dec. 1, 2008.

* cited by examiner

SENSOR FOR CHECKING VALUABLE DOCUMENTS

FIELD OF INVENTION

The invention relates to a sensor for checking documents of value, such as for example bank notes, as well as a device in which this sensor is installed, such as for example a bank-note processing apparatus, a cash machine, a payment device, etc.

BACKGROUND

In bank-note processing apparatus bank notes are checked with the aid of sensors for example for their denomination, currency, authenticity or for their state. For this purpose the bank notes are conveyed by a transport system and in doing so pass a sensor path with one or more sensors. In doing so, the bank notes are transported substantially parallel to the surface of the sensor facing the bank notes. The sensor surface is usually a plane surface having merely a small number of gaps, e.g. for measuring heads or windows, but without any elevated or depressed areas. In some sensors, the bank notes transported past slide on the sensor surface at least temporarily. However, through the sliding along of the bank notes the sensor surface is soiled and worn in the course of time. What is more, contact with the bank notes takes place randomly and in an undefined fashion, leading to an unsteady transport, e.g. the fluttering of the bank notes. This has an adverse effect on the reproducibility of the measuring results. In order to minimize the friction between the bank note and the sensor surface the sensor surface is consequently designed so as to be as flat as possible. A further disadvantage of contact-type transport is the electrostatic charge of the bank note due to the friction between the bank note and the sensor surface. For these reasons obstructions occur again and again in bank note transport when bank notes are transported past the known sensors.

SUMMARY

It is consequently the object of the invention to achieve a disturbance-free transport of documents of value, in particular of bank notes, along the sensors.

The invention is based on the idea to provide the sensor surface, along which the documents of value are transported past the sensor, with a structure of a plurality of elevations or a plurality of depressions. In terms of the invention, convex areas of the sensor surface are referred to as elevations, and concave areas of the sensor surface are referred to as depressions. For example the sensor surface has one or more structured sections, which in each case have a plurality of elevations or a plurality of depressions. In comparison to the transport along a plane sensor surface, when a document of value is transported along the surface structured according to the invention the pressing force on the sensor surface and thereby also the friction force between the document of value and the sensor surface is reduced.

It is assumed that through the structure of the sensor surface according to the invention the flow of the air displaced by the document of value changes and air cushions are created at least temporarily between the document of value and the sensor surface. These air cushions exert a force on the document of value which counteracts the pressing force on the sensor surface. There are many possible embodiments of the sensor surface according to the invention to achieve this effect. This is applicable both to the height or depth and the lateral extension of the elevations or depressions formed in the sensor surface, and to the shape and the arrangement of the elevations or depressions. However, which of these embodiments of the sensor surface is most suited for a certain transport task depends on the transport conditions in each case. For example the formation of the air cushions takes place in dependence on the size of the document of value, in dependence on the transport speed of the document of value and in dependence on the distance between the document of value and the sensor surface. These transport parameters span a large range of values regarding the conventional value-document transport tasks. Therefore, it is impossible to lay down an optimal design of the sensor surface leading to the desired effect regarding all transport tasks. Finding the sensor-surface structures best suited to the particular application must consequently be left in the end to the person skilled in the art, who will determine this on the basis of corresponding tests.

Preferably the elevations or depressions have a rounded surface. The elevations preferably have a convex shape, in particular a knob-like shape or the shape of bars extending approximately parallel to the transport direction of the document of value. The depressions preferably have a concave shape, in particular a dish-like shape or the shape of grooves extending approximately parallel to the transport direction of the document of value. Moreover all elevations or depressions within one or each structured section preferably have approximately the same shape and/or the same lateral extension and/or the same height or depth. In addition the elevations or depressions within one or each of the structured sections of the sensor surface can form a regular structure. For example all elevations or depressions within one or each of the structured sections form a two-dimensional lattice, which can be defined by a unit cell and a lattice basis consisting of one or more elevations or of one or more depressions. The unit cell has e.g. the geometrical shape of a square or a rectangle or a parallelogram or a polygon. The structured sections, in particular the regular structures or also the two-dimensional lattice, however, can be interrupted by gaps in the sensor surface and/or by plane sections.

In a preferred embodiment the elevations have a height perpendicular to the transport plane of the documents of value of 0.05 mm to 2 mm, particularly preferably of 0.1 mm to 1 mm, in particular of 0.1 mm to 0.5 mm. Alternatively the depressions have a height perpendicular to the transport plane of the documents of value of 0.05 mm to 2 mm, particularly preferably of 0.1 mm to 1 mm, in particular of 0.1 mm to 0.5 mm. The lateral extensions of the elevations or depressions, which said elevations or depressions have parallel to the transport plane of the documents of value, are greater than the height or depth of the elevations or depressions. The lateral extension in the transport direction of the documents of value is referred to as the length of the elevation or depression, the lateral extension perpendicular to the transport direction is referred to as its width. Preferably the length and/or the width of the elevations or of the depressions is at least twice as great, in particular at least 5 times as great as their height or depth. Moreover, the length of the elevations or depressions is preferably greater than their width. The length and/or the width of the elevations or depressions can for example amount to at least 0.5 mm, preferably at least 2 mm.

The width of the elevations or depressions perpendicular to the transport direction and the spacing of adjacent elevations or depressions perpendicular to the transport direction are chosen in such a fashion that the document of value extends perpendicularly to the transport direction across several elevations or depressions. Preferably the document of value extends perpendicularly to the transport direction across at least two, preferably across at least 5 elevations or depressions. The measures mentioned in the following can e.g. be used in a sensor for checking documents of value, in particular bank notes, whose length usually lies between 100 mm and 200 mm and whose width usually lies between 50 mm and 100 mm. The width and/or the spacing of the elevations or depressions perpendicular to the transport direction amount to e.g. maximally 20 mm, in particular maximally 10 mm, for example maximally 5 mm. Also parallel to the transport direction of the documents of value the spacing of directly mutually adjacent elevations or depressions amounts to maximally 20 mm, in particular maximally 10 mm, particularly preferably maximally 5 mm. In particularly preferred embodiments the spacing of directly mutually adjacent elevations or depressions parallel and/or perpendicular to the transport direction amounts to 0 mm to 2 mm.

In a first embodiment the sensor according to the invention is a sensor block, in which several sensor chambers are contained. In each of the sensor chambers there can be arranged a measuring head and/or measuring elements for checking the documents of value, which are transported past along the surface of the sensor block. This sensor block surface is formed by sensor covers covering the top of the sensor chambers (facing the documents of value), and by further covers covering the areas of the top of the sensor block disposed between and next to the sensor chambers. The sensor block surface can have one or more sections structured according to the invention, which is/are formed in the sensor covers and/or in the further covers.

In a second embodiment the sensor according to the invention has a housing with a housing surface forming the sensor surface and representing an integral part of the housing. Along the housing surface the documents of value are transported past the sensor. At least one section structured according to the invention is formed in the housing surface.

In a third embodiment the sensor according to the invention has a housing body, on whose top (facing the documents of value) there is arranged at least one front element whose surface forms the sensor surface. At least one structured section is formed in the surface of at least one of the front elements.

The sensor surface having the structured section(s) can in particular be a front element or a sensor cover or a further cover of a sensor block or a housing surface. The sensor cover structured according to the invention and/or the further cover and/or the housing surface and/or the front element can have one or more gaps. In these gaps there can be arranged measuring heads and/or transport elements, e.g. transport rollers and/or windows, through which measuring signals of the sensor are transmitted. The gaps can also be open, wherein measuring heads or measuring elements can be arranged within or directly below the gap. The sensor cover and/or the housing surface and/or the front element can be light-transmissive and have for example one or more plane sections without elevations or depressions, through which optical measuring signals of the sensor are transmitted.

In the mentioned examples the front elements or the sensor covers or the further covers of the sensor block seal the housing body or the sensor block at its top facing the document of value. Alternatively the front elements or the sensor covers or the further covers can also be applied to the top of a housing that is sealed in a dust-proof fashion from the outset. In this case the front elements or the sensor covers or the further covers can be removed from the housing advantageously without the intrusion of dust. When worn sensor surfaces are exchanged, the measuring elements then remain encapsulated in the housing in a dust-proof fashion. The front elements or the sensor covers or the further covers of the sensor block can be fixed to the respective housing or sensor block with the aid of the usual fixation types, e.g. through snap-on connecting, wedging, clamping, with the aid of screws or through bonded joining, for a permanent fixation also through pressing in or through fused joining.

The manufacture of the sensor surface according to the invention can take place for example through injection molding, embossing or deep drawing. As materials for the sensor surface, in which the elevations or depressions are formed, plastics, metals or glass can be used. Preferably the sensor surface, in particular the sensor cover and/or the further cover and/or the housing surface and/or the front element have a wear resistant plastic, e.g. glass-fiber or carbon-fiber reinforced plastic. The plastic preferably has a low friction coefficient and/or is electrically conductive, in order to prevent electrical charges through the friction of the document of value. Moreover, the used plastic can also be transparent for visible light and/or light in IR, UV. Alternatively the sensor surface can also have hardened or hard-coated aluminum or a sheet metal plate, e.g. of aluminum, magnesium or high-grade steel. In order to achieve the mentioned properties of the sensor surface, the sensor surface can also be coated with suitable materials.

Besides the sensor itself, a further aspect of the invention is that part of the sensor which forms the sensor surface according to the invention. The part of the sensor which on its surface has the plurality of elevations or depressions can be a sensor cover of a sensor block or a further cover of a sensor block or a front element for covering a housing body or a complete sensor housing or a partial housing of the sensor. The sensor component is configured so as to be assembled with further sensor components to form a complete sensor.

The invention also relates to a device for checking documents of value having one or more sensors according to the invention, for example a processing machine for documents of value, in particular for bank notes, coupons, tokens, vouchers or checks. The processing machine can be a checking- and sorting apparatus or also a cash machine, a deposit apparatus, a bank-note recycling apparatus or a payment device. In the device several sensors can be arranged on one or both sides of the transport path of the documents of value, e.g. opposite each other. Both sensors disposed opposite each other can have a sensor surface structured according to the invention. Alternatively, opposite a sensor according to the invention also a guide element can be arranged, whose surface is formed like a sensor surface structured according to the invention. The arrangement of the elevations or depressions of the structured surfaces disposed opposite can be mirror-inverted opposite or also offset from each other.

Moreover, the invention relates to a method for checking documents of value, in which the documents of value are transported past a sensor according to the invention for example with the aid of belts and/or with the aid of rollers. The transport speed of the documents of value here usually lies in a range between 0.1 m/s and 10 m/s. Upon the transporting past of the document of value along the sensor surface air cushions are formed at least temporarily between the document of value and the sensor surface.

Upon the transport of the documents of value with the aid of belts, the belts exert a pressing force on the document of value in the direction of the sensor surface, so that the documents of value touch the sensor surface at least temporarily. Alternatively, the documents of value can be transported past along the sensor surface also in a belt-free fashion and only with the aid of rollers, which are arranged on both sides of the transport plane of the documents of value and ensure a permanent clamping of the documents of value. The distance between the document of value and the sensor surface here usually lies within a range between 1 mm and 5 mm. Depending on the distance between the document of value and the sensor surface a more or less strong and frequent contact between the sensor surface and the documents of value can occur. The sensor surface structured according to the invention can be used for both of these transport types, wherein the concrete embodiment of the sensor surface is to be chosen in dependence on the respective type of transport, in particular on the transport speed and distance.

The transport direction of the documents of value defines on the sensors arranged along the transport path of the document of value a respective input side, on which the document of value is guided into the detection range of the sensor, and an output side, on which the document of value is guided out of the detection range. The front element or the sensor cover or the further cover or the housing is preferably designed and arranged in such a fashion that on the surface facing the document of value it is beveled on the input side and/or beveled on the output side. Through these bevelings there are formed in the direct proximity of the transported document of value obtuse-angled edges and none that adversely affect the transport.

The sensors according to the invention can be e.g. mechanical sensors, magnetic sensors, capacitive sensors, ultrasound sensors or also photo sensors, which are used for the optical checking of the documents of value in the UV, VIS or IR.

BRIEF DESCRIPTION OF THE DRAWINGS

The invention will hereinafter be described by way of example with reference to the accompanying drawings.

The figures are described as follows.

DETAILED DESCRIPTION OF VARIOUS EMBODIMENTS OF THE DISCLOSURE

Figure 1:
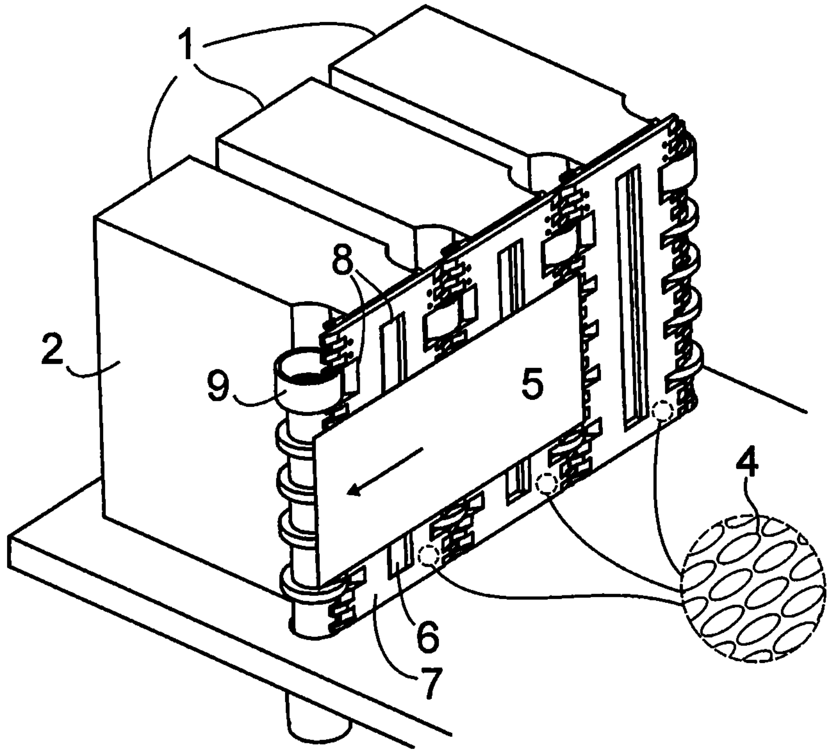
FIG. 1 a perspective view of three adjacent sensors, each with one front element on the sensor surface, FIG. 2 a sectional view of the transport channel between a sensor and a guide element arranged opposite, FIG. 3*a* a perspective view of a front element for several measuring heads, FIG. 3*b* a sectional view through the front element of FIG. 3*a* with the measuring heads, FIG. 4*a* a lateral view of a sensor block with two sensor chambers, FIG. 4*b* a perspective view of a further cover for the sensor block of FIG. 4*a*, FIG. 5 a sectional view through a housing with window, and FIGS. 6*a-e* a schematic representation of different regular structures of the sensor surface in a top view.

FIG. 1 shows a perspective view of three adjacent sensors 1 configured for checking documents of value 5 and arranged on one side of a transport path of the documents of value 5. The documents of value 5 are for example transported through roller transport parallel to the surface of the sensors 1, e.g. in the transport direction W indicated by the arrow. Opposite the sensors 1 further sensors can be arranged, which can also have a structured sensor surface with a plurality of elevations 4 or depressions 3. The sensors 1 each have a housing body 2 on whose top a front element 7 is arranged. To improve the transport of documents of value in the transition area between the sensors 1 the front elements 7 are each provided with a comb structure on their input side and on their output side. The comb structures of the adjacent front elements 7 are preferably configured in such a fashion that they mutually engage each other, i.e. teeth of the one front element 7 can be arranged at least partially in gaps of the adjacent front element 7 and vice versa. Apart from this, in the front elements 7 gaps 8 are formed, in which transport rollers 9 and windows 6 are arranged, through which the sensors 1 can detect measuring signals. In the surface of the front elements 7 outside the gaps 8 and the comb structure a regular structure of a plurality of elevations 4 is formed consistently, said elevations forming a section 16 structured according to the invention of the front element 7.

Figure 2:
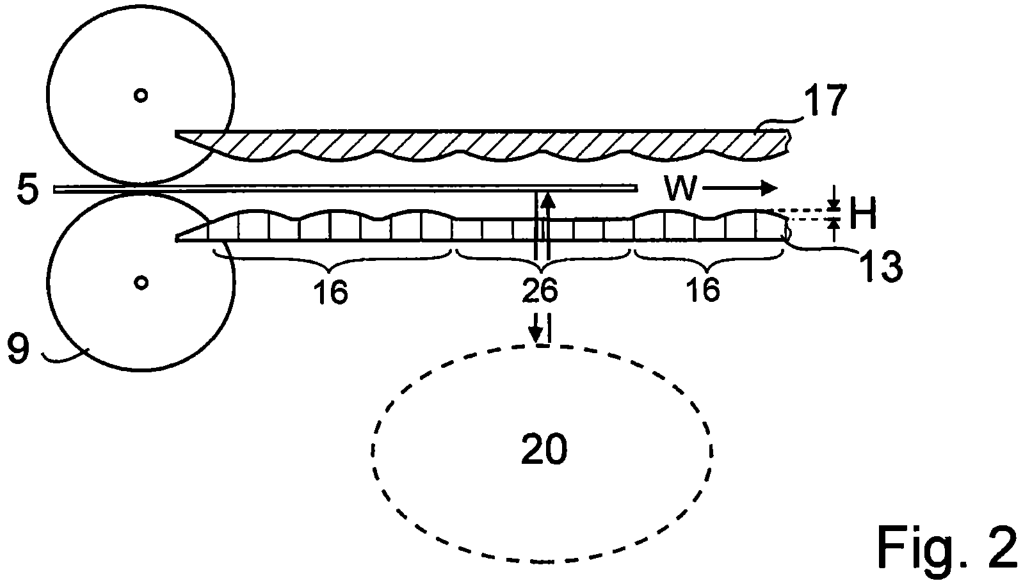

The documents of value 5 are guided along the sensor surface for example with the aid of transport rollers 9 through a transport channel formed between the sensor and a guide element 17 arranged opposite, cf. FIG. 2. The guide element 17 can also have a structured section 16 of a plurality of elevations 4 or depression 3. The surface of the guide element 17 can be configured analogously to the sensor surface according to the invention of the opposite sensor. The elevations or depressions of the two opposite surfaces here can be arranged, as shown in FIG. 2, either opposite each other in a mirror-inverted fashion or offset from each other in the transport direction and/or perpendicular to the transport direction. In the embodiment of FIG. 2 the sensor surface is formed by a front element 13 of an optical sensor, with said front element being transparent at least for visible light and for IR. Within the optical sensor there are arranged measuring elements 20 which emit light so as to illuminate the document of value 5 and detect light emitted back by the document of value 5, in particular light sources or arrays of light sources and/or detectors or arrays of detectors. So as not to adversely affect the optical beam path, the front element 13 has a plane section 26, in which the section 16 structured according to the invention is interrupted and through which the light is transmitted without any disturbing deflection. Alternatively opposite the optical sensor, on the other side of the transport channel, instead of the guide element 17 a further optical sensor and/or a further light source and/or a further detector can be arranged, which are used for measuring the light transmitted through the document of value 5.

Figure 3A:
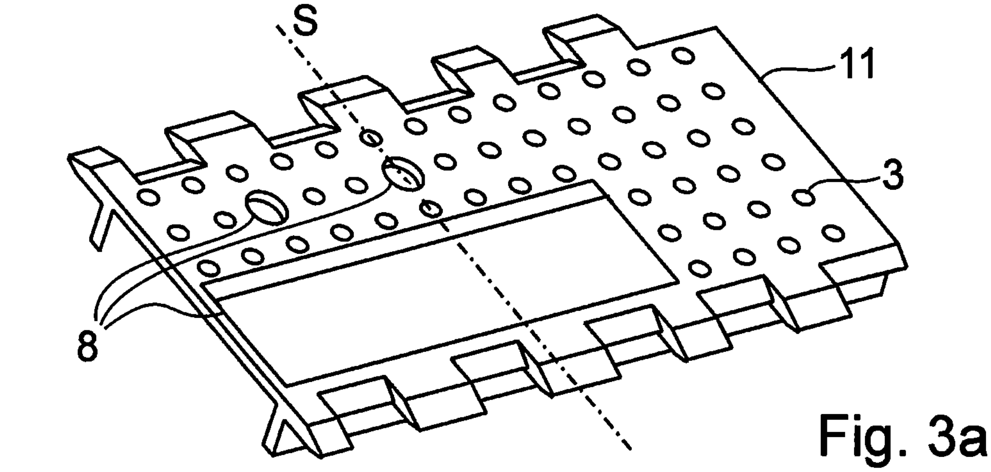
Figure 3B:
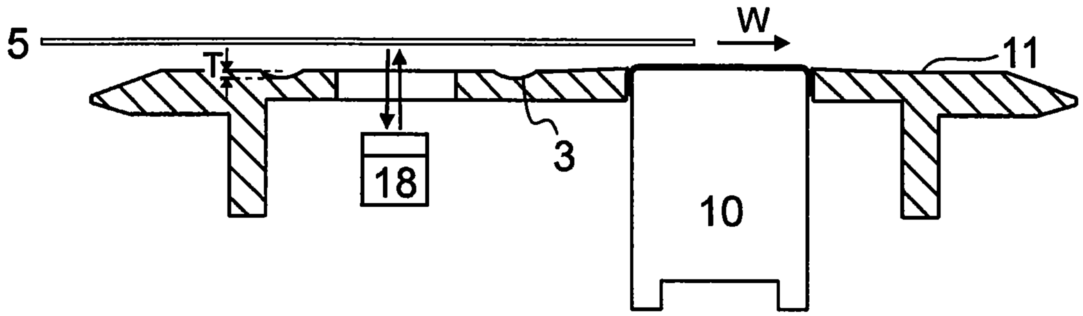

In the FIGS. 3*a* and 3*b* there is represented a further embodiment of a front element 11 configured for arrangement on a housing body, in which several measuring heads 10, 18 are arranged. The front element 11 has a section structured according to the invention extending across the complete front element 11 and having a plurality of depressions 3 of the depth T, as well as three gaps 8. The large gap serves to accommodate a measuring head 10 which can be configured for example for measuring magnetic properties of the document of value. The two smaller gaps 8 remain unsealed, so that the measuring signals of the measuring heads 18 arranged directly underneath are transmitted through the gaps. The measuring heads 18 are for example ultrasound measuring heads with which the ultrasound reflection or the ultrasound transmission of the documents of value 5 transported past is detected.

Figure 4A:
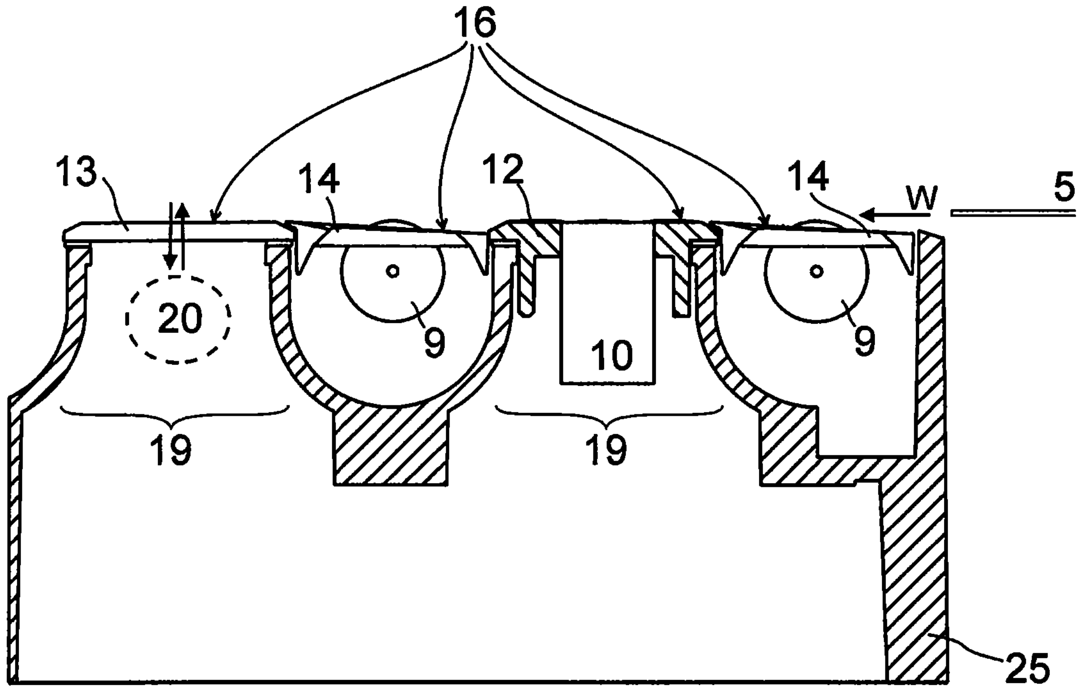
Figure 4B:
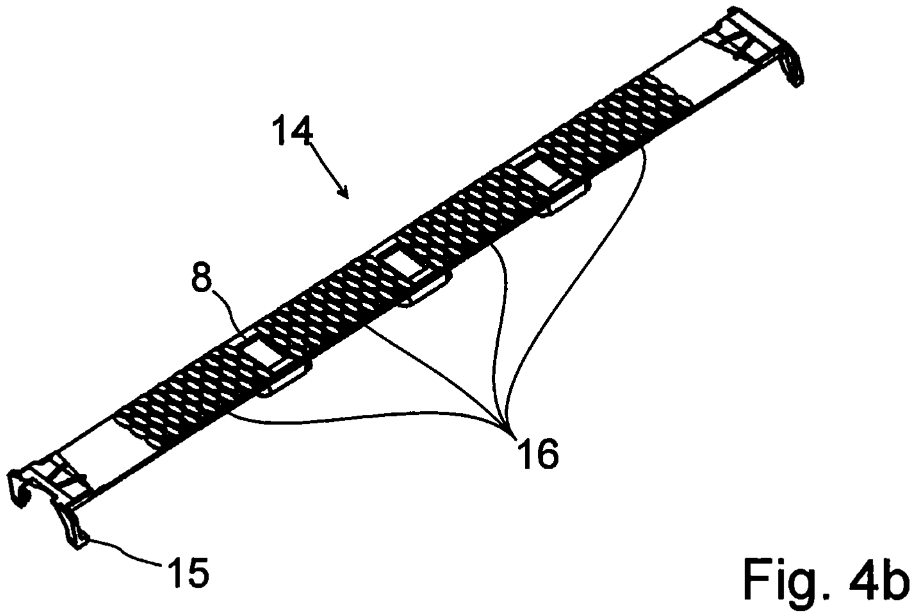

In a further embodiment the sensor surface structured according to the invention is a surface of a sensor block 25, cf. FIG. 4*a* and FIG. 4*b*. The sensor block contains two sensor chambers 19, one for accommodating optical measuring elements 20 and one for accommodating a measuring head 10. The left sensor chamber 19 with the optical measuring elements 20 is sealed by a transparent plastic cover 13, in whose surface there is formed a section 16 structured according to the invention which is interrupted in the area of the optical measuring elements 20 by a plane section 26. On the top of the right sensor chamber 19 there is arranged a cover 12 in whose gap a measuring head 10 is arranged. On the surface of the sensor block 25 there are furthermore arranged two further covers 14, which are also provided with structured sections 16, cf. FIG. 4*b*. The further covers 14 have gaps 8, through which transport rollers 9 extend out of the sensor block 25 and into the transport channel of the documents of value 5. Both the sensor covers 12, 13 and the further covers 14 can be fixed e.g. with the aid of clamping noses 15 to the sensor block 25. The further cover 14 shown in FIG. 4*b* has four sections 16 structured according to the invention. Also the sensor covers 12, 13 can have one or more sections 16 structured according to the invention.

Figure 5:
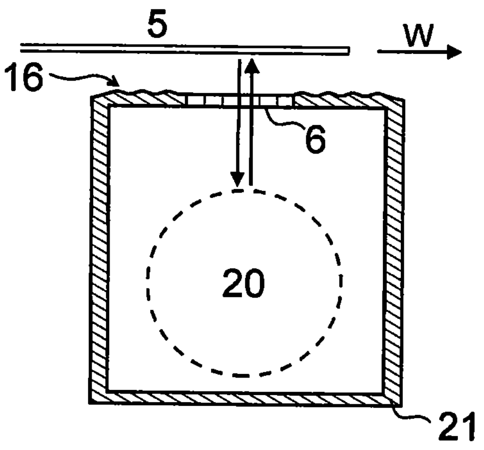

In FIG. 5 a different embodiment of a sensor according to the invention is shown, which has a housing 21 in whose surface one or more sections 16 structured according to the invention are formed. The housing 21 can be manufactured e.g. from injection-molding, the elevations or depressions according to the invention being produced by the injection mold itself. On the top of the sensor a window 6 can be arranged, through which the measuring signals of the optical measuring elements 20 of the sensor are transmitted.

Figure 6:
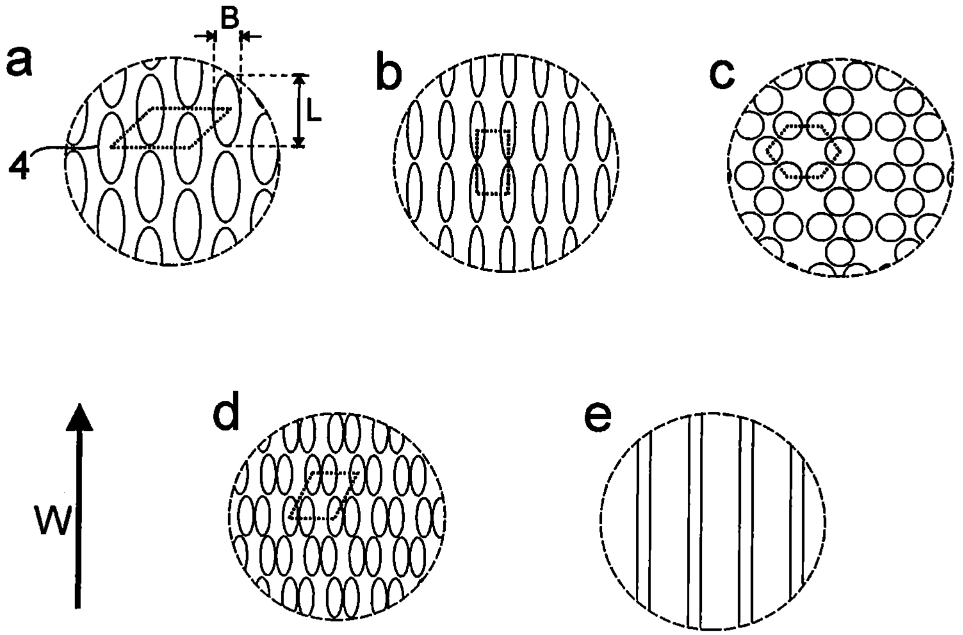

FIG. 6 schematically shows some embodiments of sensor surfaces structured according to the invention. The elevations 4 or depressions 3 here are sketched with reference to the boundary line of their base. In each partial FIGS. 6*a*-6*e* respectively one circular portion of a regular structure of elevations or depressions is shown, which extends over a structured section 16, e.g. over the complete length of the sensor cover 12, 13 or of the front element 7, 11 or of the further cover 14 or of the housing 21. The regular structure can be interrupted, e.g. by gaps or plane sections. The shown regular structures are chosen only by way of example and are in no way limiting with regard to the dimensions, proportions, spacing and arrangement of the elevations 4 or depressions 3 which the sensor surface according to the invention can have.

Many of the regular structures of the sensor surface according to the invention can be defined analogously to crystal lattices by a unit cell on whose corners there is arranged a respective lattice base. The lattice base can consist of one elevation 4 or of one depression 3, but it can also consist of several elevations 4 or depressions 3. The unit cell can have e.g. the geometrical shape of a polygon. The basic surface of these elevations or depressions can for example be circular or oval or elliptic.

In FIG. 6*a* there is shown a regular structure of elevations 4, whose unit cell is a parallelogram (drawn in dotted lines). The lattice base in this case consists of only one elevation 4. Alternatively the regular structure of FIG. 6*a* can of course also consist of depressions 3 instead of the elevations 4. To illustrate the dimensions of the individual elevations 4 or depressions 3 in FIG. 6*a* its length L is indicated, which it has in the transport direction of the document of value (arrow) and its width B, which the elevation or depression has perpendicular to the transport direction (parallel to the transport plane). The length L of the elevations 4 or depressions 3 in this example amounts to approximately 7 mm and is greater than their width B, which in this example amounts to approximately 3 mm. FIG. 6*b* shows an alternative embodiment of a regular structure having a rectangular unit cell (drawn in dotted lines) and likewise contains only one elevation 4 or depression 3 as lattice basis. The regular structure of FIG. 6*c* is defined by a hexagon (drawn in dotted lines) as unit cell and likewise contains only one elevation 4 or depression 3 as lattice basis. FIG. 6*d* shows a regular structure which is defined through a parallelogram as unit cell (drawn in dotted lines), but has a lattice basis of two elevations 4 or depressions 3. The elevations or depressions of the regular structure of FIG. 6*e* have the shape of bars or grooves, whose length L in the transport direction is much greater than their width B perpendicular to the transport direction. The bars or grooves can extend in the transport direction over the complete structured section 16, e.g. over the complete length of the sensor cover 12, 13 or of the front element 7, 11 or of the further cover 14 or of the housing 21.

The invention claimed is:

1. A sensor for checking documents of value, said sensor comprising a sensor surface and being configured to check documents of value which are transported in a transport direction (W) along the sensor surface past the sensor, said sensor surface comprising at least one structured section having at least one of a plurality of elevations or a plurality of depressions.

2. The sensor according to claim 1, wherein at least one of the elevations or depressions have a rounded surface.

3. The sensor according to claim 1, wherein the elevations have a convex shape or the shape of bars extending approximately parallel to the transport direction of the document of value.

4. The sensor according to claim 1, wherein the depressions have a concave shape or the shape of grooves extending approximately parallel to the transport direction of the document of value.

5. The sensor according to claim 1, wherein at least one of all elevations or depressions within the structured section have approximately at least one of the same shape, lateral extension (B, L), height (H), or depth (T), with the plurality of elevations or depressions within the structured section.

6. The sensor according to claim 1, wherein at least one of all elevations or depressions within the structured section form a two-dimensional lattice defined by a unit cell and a lattice basis, with the lattice basis consisting of exactly one elevation or depression or of several elevations or of several depressions.

7. The sensor according to claim 1, wherein the elevations have a height (H) of 0.05 mm to 2 mm, or the depressions have a depth (T) of 0.05 mm to 2 mm.

8. The sensor according to claim 1, wherein at least one of a lateral extension (L) of the elevations or depressions parallel to the transport direction, or a lateral extension (B) of the elevations or depressions perpendicular to the transport direction is at least twice as great as the height of the elevations or the depth of the depressions.

9. The sensor according to claim 1, wherein at least one of the lateral extension (L) of the elevations or of the depressions parallel to the transport direction of the documents of value is greater than a lateral extension (B) perpendicular to the transport direction, with the elevations or the depressions parallel to the transport direction preferably having an extension (L) of at least 0.5 mm.

10. The sensor according to claim 1, wherein at least one of the elevations or depressions perpendicular to the transport direction of the documents of value have an extension (B) of at least 0.5 mm.

11. The sensor according to claim 1, wherein the spacing between directly mutually adjacent elevations or depressions that are at least one of being parallel or perpendicular to the transport direction amounts to maximally 10 mm.

12. The sensor according to claim 1, wherein the sensor comprises a sensor block, in which several sensor chambers are contained and which has a sensor block surface along which the documents of value are transported past the sensor block, with the sensor block surface having at least one structured section.

13. The sensor according to claim 12, wherein, on the sensor block surface there is arranged at least one sensor cover of a sensor chamber, in which at least one structured section is formed, on the sensor block surface there is arranged besides the sensor covers at least one further cover, in which at least one structured section is formed, or combinations thereof.

14. The sensor according to claim 1, including a housing for the sensor, said housing having a housing surface along which the documents of value are transported past the sensor, with at least one structured section being formed in the housing surface.

15. The sensor according to claim 14, wherein, on the sensor block surface there is arranged at least one sensor cover of a sensor chamber, in which at least one structured section is formed, on the sensor block surface there is arranged besides the sensor covers at least one further cover, in which at least one structured section is formed, or combinations thereof; and wherein at least one of the sensor surface or the sensor cover or the further cover or the housing surface has at least one gap, said gap having at least one of the following features in which or directly below which a measuring head is arranged or through which the measuring signals of the sensor are transmitted or in which a window or a transport element is arranged.

16. The sensor according to claim 1, including a housing body for the sensor and on whose top there is arranged at least one front element, along which the documents of value are transported past the sensor, with at least one structured section being formed in a surface of the front element.

17. The sensor according to claim 1, wherein, on the sensor block surface there is arranged at least one sensor cover of a sensor chamber, in which at least one structured section is formed, on the sensor block surface there is arranged besides the sensor covers at least one further cover, in which at least one structured section is formed, or combinations thereof; including a housing for the sensor, said housing having a housing surface along which the documents of value are transported past the sensor, with at least one structured section being formed in the housing surface; and wherein the sensor surface or the sensor cover or the housing surface, has at least one light-transmissive, plane section, through which measuring signals of the sensor are transmitted.

18. The sensor according to claim 1, wherein, on the sensor block surface there is arranged at least one sensor cover of a sensor chamber, in which at least one structured section is formed, on the sensor block surface there is arranged besides the sensor covers at least one further cover, in which at least one structured section is formed, or combinations thereof; a housing for the sensor, said housing having a housing surface along which the documents of value are transported past the sensor, with at least one structured section being formed in the housing surface; and wherein the plurality of elevations or depressions are formed in the sensor surface or in the sensor cover or in the further cover or in the housing surface through injection-molding or embossing or deep drawing.

19. The sensor according to claim 1, wherein, on the sensor block surface there is arranged at least one sensor cover of a sensor chamber, in which at least one structured section is formed, on the sensor block surface there is arranged besides the sensor covers at least one further cover, in which at least one structured section is formed, or combinations thereof; a housing for the sensor, said housing having a housing surface along which the documents of value are transported past the sensor, with at least one structured section being formed in the housing surface; and wherein the sensor surface or the sensor cover or the further cover or the housing surface completely or partially comprises one or more of the following materials: plastic, metal or sheet metal.

20. A sensor component for forming a sensor surface of a sensor constructed according to claim 1, wherein the sensor component has on its surface at least one structured section comprising at least one of a plurality of said elevations or a plurality of depressions.

21. The sensor component according to claim 20, wherein the sensor component comprises at least one of a housing of the sensor or a sensor cover for a sensor block or a further cover for a sensor block or a front element of the sensor.

22. An apparatus for checking documents of value comprising at least one sensor constructed according to claim 1.

23. A method for checking documents of value comprising transporting the documents of value past a sensor constructed according to claim 1.

24. The method according to claim 23, including transporting the documents of value past along the sensor surface with the aid of belts, rollers, or combinations thereof.

25. The method according to claim 24, wherein, upon the transporting past of the documents of value along the sensor surface, air cushions are created.

* * * * *